United States Patent
Hampiholi et al.

(10) Patent No.: US 9,301,077 B2
(45) Date of Patent: Mar. 29, 2016

(54) CONTEXT-BASED AUDIO TUNING

(71) Applicant: Harman International Industries, Incorporated, Stamford, CT (US)

(72) Inventors: Vallabha Vasant Hampiholi, Bangalore (IN); Girisha Ganapathy, Bangalore (IN)

(73) Assignee: Harman International Industries, Incorporated, Stamford, CT (US)

( * ) Notice: Subject to any disclaimer, the term of this patent is extended or adjusted under 35 U.S.C. 154(b) by 242 days.

(21) Appl. No.: 14/146,158

(22) Filed: Jan. 2, 2014

(65) Prior Publication Data

US 2015/0189438 A1 Jul. 2, 2015

(51) Int. Cl.
*H04R 5/02* (2006.01)
*H04S 7/00* (2006.01)

(52) U.S. Cl.
CPC .............. *H04S 7/302* (2013.01); *H04R 2499/13* (2013.01)

(58) Field of Classification Search
USPC ......... 381/17, 80, 86, 98, 101, 103, 104, 300, 381/302, 307, 310; 700/94
See application file for complete search history.

(56) References Cited

U.S. PATENT DOCUMENTS

| | | | |
|---|---|---|---|
| 7,440,578 B2 | 10/2008 | Arai et al. | |
| 7,561,703 B2 | 7/2009 | Nakamura | |
| 8,019,454 B2 | 9/2011 | Haulick et al. | |
| 2004/0156514 A1 | 8/2004 | Fletcher et al. | |
| 2008/0165984 A1* | 7/2008 | Yun | H04M 1/6091 381/86 |
| 2010/0098267 A1* | 4/2010 | Kosinski, II | H04R 5/00 381/107 |
| 2010/0175014 A1* | 7/2010 | Obradovich | B60G 17/0195 715/771 |
| 2012/0203657 A1* | 8/2012 | Jacob Sushil | G06Q 50/01 705/26.5 |
| 2012/0263306 A1* | 10/2012 | McGowan | H04R 1/403 381/17 |
| 2012/0321099 A1 | 12/2012 | Eichfeld et al. | |
| 2014/0270254 A1* | 9/2014 | Oishi | H04R 3/04 381/98 |
| 2015/0078596 A1* | 3/2015 | Sprogis | H04R 5/027 381/303 |

OTHER PUBLICATIONS

International Search Report and Written Opinion for International Application No. PCT/US2014/072039 dated Apr. 9, 2015.

* cited by examiner

*Primary Examiner* — Vivian Chin
*Assistant Examiner* — Friedrich W Fahnert
(74) *Attorney, Agent, or Firm* — Brooks Kushman P.C.

(57) ABSTRACT

A system and method is provided for selecting an audio tuning profile to apply to audio signals to generate a sound field acoustically optimized at least at one listening position in a listening environment, such as a vehicle passenger compartment. Each audio tuning profile may include a number of audio settings to be applied to an audio signal at one or more audio loudspeaker channels. The audio tuning profile may be selected based on the content or the source of the audio data signals. Thus, audio tuning may be based on the context of the audio.

19 Claims, 5 Drawing Sheets

CONTEXT-BASED AUDIO TUNING

TECHNICAL FIELD

The present disclosure relates to a system, apparatus and method for selecting an audio tuning profile based on the content or source of an audio signal.

BACKGROUND

The listening environment inside a vehicle presents numerous complexities that impact the quality of sound reproduction. The placement of loudspeakers in vehicle listening environments is often less than optimal. Vehicle listening environments are relatively confined and loudspeakers are located in fairly close proximity to a listener. The loudspeakers tend to have various frequency response ranges. It is difficult to locate each loudspeaker the same distance to a listener considering front and rear seat positioning and their proximity to vehicle doors. Moreover, vehicle interiors are irregular in nature and full of materials that absorb or reflect sound, which can result in some frequencies getting muffled while others are amplified. To address these and other complexities, car audio systems are often tuned to optimize the sound stage in a vehicle listening environment. Car audio tuning involves manipulating the frequency profile of audio using equalizers, crossovers, and/or sound processors to achieve an acoustically optimized sound field. Vehicle manufactures usually tune car stereos to a particular seat location, which is most often the driver's seat, preventing listeners in other seat locations from enjoying a complete audio experience.

SUMMARY

One or more embodiments of the present disclosure relate to a method for selecting a sound field acoustically optimized at least at one listening position in a vehicle environment. The sound field may be generated by a group of loudspeakers according to audio settings associated with a tuning profile. The group of loudspeakers may include a first loudspeaker and at least a second loudspeaker. The method may include selecting a primary tuning profile based on audio system inputs and transmitting a primary audio signal to the group of loudspeakers according to the primary tuning profile. The method may further include receiving an input indicative of a secondary audio signal and transmitting the secondary audio signal to the group of loudspeakers according to a secondary tuning profile when the secondary audio signal has priority over the primary audio signal. The secondary tuning profile may be selected based at least on the content of the secondary audio signal.

Transmission of the primary audio signal to the group of loudspeakers may be interrupted during transmission of the secondary audio signal. Alternatively, the primary audio signal may be attenuated while the secondary audio signal is transmitted to the group of loudspeakers. The primary audio signal may be an entertainment audio signal. Moreover, the primary tuning profile may be selected based on selection input received from a user.

The secondary tuning profile may be further selected based on a content source of the secondary audio signal. Moreover, the secondary audio signal may be a navigation prompt received from a navigation system, a vehicle system alert signal received from a vehicle system controller, a traffic alert received from a traffic information system, or a text-to-speech signal corresponding to a text message or an electronic mail message received from a connected mobile device.

One or more additional embodiments of the present disclosure relate to a system for selecting an audio tuning profile for providing a sound field acoustically optimized at least at one listening position in a vehicle environment. The sound field may be generated by a group of loudspeakers, including a first loudspeaker and at least a second loudspeaker, according to the audio tuning profile. The system may include a signal source unit configured to transmit audio signals from a plurality of audio sources. The audio signals may include a primary audio signal and at least a secondary audio signal. The system may further include a signal processing unit configured to receive the primary audio signal from the signal source unit and transmit the primary audio signal to the group of loudspeakers according to a primary tuning profile. The signal processing unit may be further configured to receive the secondary audio signal from the signal source unit when the secondary audio signal has priority over the primary audio signal. The signal processing unit may be further configured to select a secondary tuning profile based on content of the secondary audio signal and transmit the secondary audio signal to the group of loudspeakers according to the secondary tuning profile.

The signal processing unit may be integrated with an amplifier. The signal processing unit may also include a memory unit having at least a first set of audio settings associated with the primary tuning profile and a second set of audio settings associated with the secondary tuning profile. The second set of audio settings may be different from the first set of audio settings. The signal processing unit may further include an audio post-processing module that applies the first set of audio settings to the primary audio signal and the second set of audio settings to the secondary audio signal.

The primary audio signal may be temporarily interrupted during transmission of the secondary audio signal. Alternatively, the primary audio signal may be attenuated during transmission of the secondary audio signal. The primary audio signal may be an entertainment audio signal. Moreover, the secondary audio signal may be a vehicle alert or prompt. The secondary audio signal may also be a text-to-speech signal corresponding to a text message or an electronic mail message received from a connected mobile device.

One or more additional embodiments of the present disclosure relate to an audio signal processing and amplification device. The audio signal processing and amplification device may include a streaming interface configured to receive audio data signals from a signal source unit. The audio data signals may originate from a plurality of audio sources. The audio signal processing and amplification device may further include a command interface configured to receive audio command signals corresponding to the audio data signals from the signal source unit. The audio command signals may include an audio tuning profile command. The audio signal processing and amplification device may further include a memory unit configured to store a plurality of audio tuning profiles. Each audio tuning profile may include audio settings for generating a sound field acoustically optimized at least at one listening position in a vehicle environment.

Additionally, the audio signal processing and amplification device may include an audio post-processing module configured to receive the audio data signals and corresponding audio command signals and retrieve an audio tuning profile from the plurality of audio tuning profiles based on the audio tuning profile command. The audio post-processing module may be further configured to process the audio data signals according to the audio settings associated with the audio tuning profile and transmit the processed audio data signals to a group of loudspeakers. The group of loudspeakers may include a first loudspeaker and at least a second loudspeaker. Transmitting the processed audio data signal to the group of loudspeakers may generate the acoustically optimized sound field associated with the audio tuning profile based on the content of the audio data signals.

DETAILED DESCRIPTION

Figure 1:
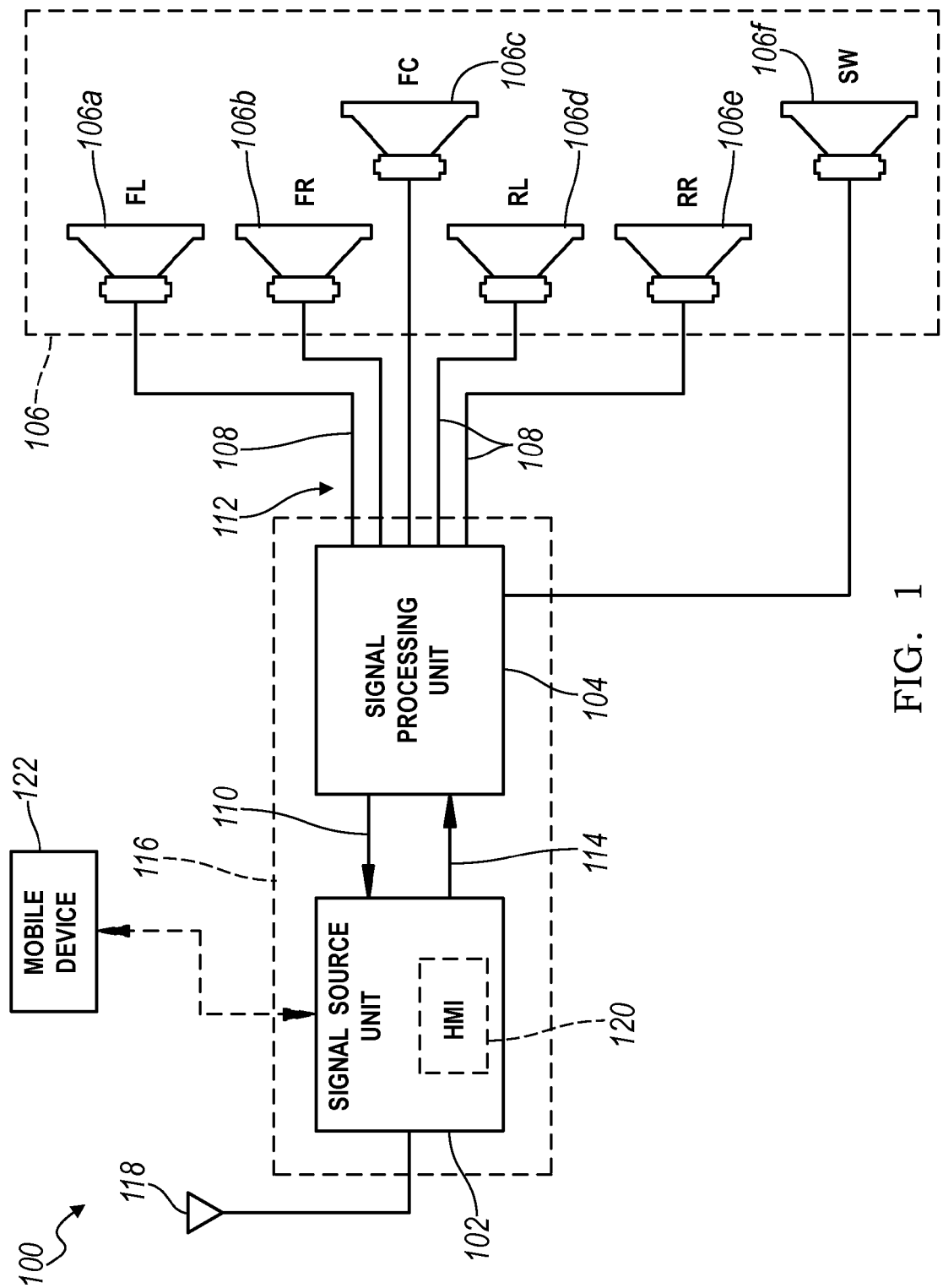
FIG. 1 is a simplified, exemplary block diagram of an audio system, in accordance with one or more embodiments of the present disclosure.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

FIG. 1 depicts an exemplary audio system 100 for delivering multimedia content in a vehicle environment. The audio system 100 may include a signal source unit 102, a signal processing unit 104, and a plurality of loudspeakers 106. The plurality of loudspeakers 106 may include a first loudspeaker and at least a second loudspeaker. For ease of explanation, the exemplary audio system illustrated in FIG. 1 is configured to provide 5.1 channel surround sound. Accordingly, the plurality of loudspeakers 106 may include a front left loudspeaker 106a, a front right loudspeaker 106b, a front center loudspeaker 106c, a rear left loudspeaker 106d, a rear right loudspeaker 106e, and a subwoofer 106f. However, one or more embodiments of the present disclosure may be implemented using any number of multi-channel audio set-ups, such as 4.0 channel, 7.1 channel, and the like.

The plurality of loudspeakers 106 may include one or more groups of loudspeakers 106, with each group of loudspeakers assigned to at least one listening position in a vehicle passenger compartment for generating a sound field. The signal source unit 102 may provide an audio signal to each loudspeaker using a respective audio channel. The signal processing unit 104 may perform a number of audio post-processing functions that can be applied to at least one audio channel 108 supplying a loudspeaker 106. Such audio post-processing functions may include introducing speaker delays, performing graphic and parametric audio equalization, controlling audio tone (e.g., bass, mid-range, or treble), audio balancing and fading, controlling individual audio channel volume, muting or unmuting individual audio channels, audio mixing, or the like. The preceding list of audio post-processing functions is merely indicative of the capabilities of the signal processing unit 104, and not exhaustive. The signal processing unit 104 may be capable of performing additional audio post-processing functions not specifically mentioned without departing from the scope of the present disclosure.

As shown in FIG. 1, the signal source unit 102 may communicate with the signal processing unit 104. For instance, the signal source unit 102 may deliver audio data signals 110 to the signal processing unit 104. The signal processing unit 104 may perform or apply one or more of the number of audio post-processing functions to the audio data signals 110 to obtain a number of processed audio signals 112. The signal processing unit 104 may then deliver one or more of the number of processed audio signals 112 to a group of loudspeakers 106 via their respective audio channels 108. The digital signal processing applied to the audio data signals 110 may differ between respective audio channels 108 so that a particular sound field may be acoustically optimized at least at one listening position. Accordingly, the signal source unit 102 and the signal processing unit 104 may also exchange audio command signals 114. The audio command signals may include control commands from the signal source unit 102 to the signal processing unit 104, as well as feedback signals from the signal processing unit 104 to the signal source unit 102.

The control commands may instruct the signal processing unit 104 to apply one or more of the audio post-processing functions to the corresponding audio data signals 110. The control commands may include signal processing parameters to be applied on a channel-by-channel basis. Alternatively, the signal processing unit 104 may maintain a number of audio tuning profiles in memory. Each audio tuning profile may include audio settings to be applied to an audio data signal 110 by the signal processing unit 104. In this manner, the audio command signal 114 may contain a control command for instructing the signal processing unit 104 on which audio tuning profile to apply to the corresponding audio data signals 110. The control command may be an audio tuning profile identifier or it may be an audio content or source identifier such that the signal processing unit 104 knows which audio tuning profile settings to retrieve from memory. The processed audio signals 112 may then be delivered via their respective audio channels 108 to a corresponding group of loudspeakers 106 to generate a sound field acoustically optimized at least at one listening position in a vehicle environment based on the selected audio tuning profile.

Though illustrated separately in FIG. 1, the signal processing unit 104 may be integrated with or internal to the signal source unit 102. Moreover, the signal processing unit 104 may be an amplifier or integrated with an amplifier to provide an audio signal processing and amplification device. Such an amplifier may likewise be internal or external with respect to the signal source unit 102. Whether integrated or separate devices, the signal source unit 102 and the signal processing unit 104 may be collectively referred to as an infotainment system 116.

According to one or more embodiments of the present disclosure, the signal source unit 102 may be an infotainment head unit configured to provide audio/video playback, navigation, and telematics-based services. To this end, the infotainment system 116 may include such functions as AM/FM, digital or satellite radio, compact disc (CD) or digital video disc (DVD) playback, multimedia accessories, rear seat entertainment, camera integration, Bluetooth connectivity, and telecommunications connectivity. The signal source unit 102 may include a plurality of antennas, collectively represented in FIG. 1 as antenna 118. The plurality of antennas 118 may include various radio antennas (e.g., AM, FM, satellite, etc.), a Bluetooth antenna, a global positioning system (GPS) antenna, as well as other vehicle telecommunications antennas for performing various telematics-based services and the like. In addition to GPS-based navigation, other telematics-based communications may involve integrated hands-free cell phones, wireless vehicle safety communications, emergency warning systems, mobile Internet, traffic and weather reports, or the like.

Further, the signal source unit 102 may include a human-machine interface (HMI) 120 to provide a user access to select and control the various functions available. The signal source unit HMI 120 may include a plurality of input buttons, knobs, and the like (not shown). The HMI 120 may also include a graphical user interface (GUI) (not shown). The GUI may include touch-screen technology for receiving additional user input. One or more mobile devices 122 may be connected to the signal source unit 102 by wire through a universal serial bus (USB), auxiliary, or other dedicated port. Alternatively, a mobile device 122 may be connected to the signal source unit 102 wirelessly, such as via Bluetooth pairing. Accordingly, in the present disclosure, a general reference to a connected mobile device may encompass both wired and wireless connections to the signal source unit 102.

Though described as a signal source unit 102, the term should not be interpreted to mean that all audio content necessarily originated from within the signal source unit 102. Rather, the signal source unit 102 may receive original audio content from external sources or devices, such as a connected mobile device 122. Further, the signal source unit 102 may deliver audio data signals 110 in response to information received from external traffic information systems or weather information systems, GPS satellites, or the like (not shown). Thus, as used herein, the signal source unit 102 may refer to an apparatus that delivers audio data signals 110 to the signal processing unit 104, whether internal or external, for distribution to one or more of the plurality of loudspeakers 106 via their respective audio channels 108. Moreover, although one or more embodiments are disclosed in the context of a full-feature infotainment head unit for purposes of description, such embodiments are exemplary only. The signal source unit 102 may also be embodied in various other types of car audio head units, including those with lesser capabilities such as car stereo receivers lacking integrated navigation or Bluetooth functionality.

Figure 2:
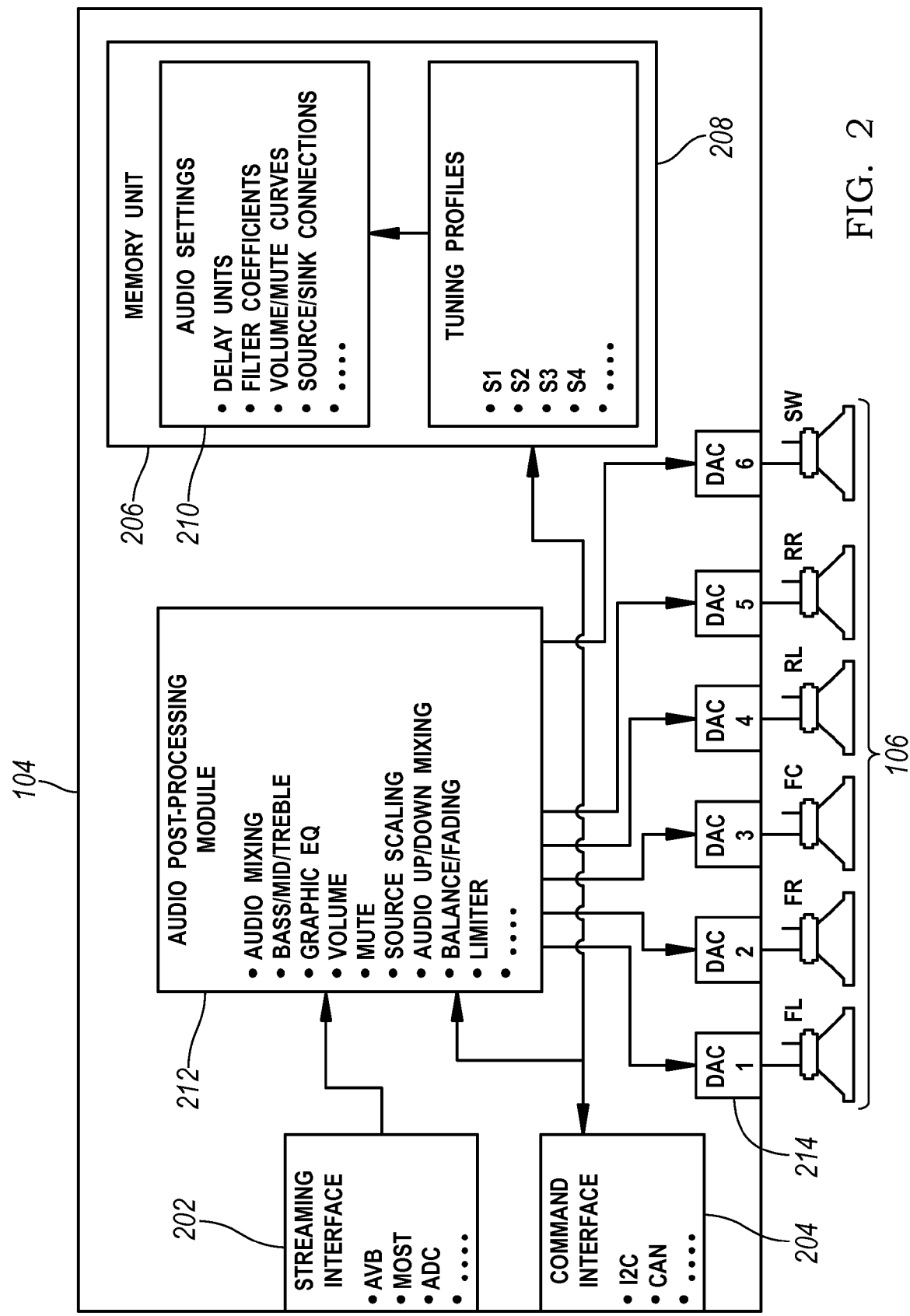
FIG. 2 is a simplified, exemplary block diagram of a signal processing unit, in accordance with one or more embodiments of the present disclosure.

The signal processing unit 104 is shown in greater detail in FIG. 2. As previously described, the signal processing unit 104 may be integrated with an amplifier to provide an audio signal processing and amplification device. Further, the signal processing unit 104 may be internal to the signal source unit 102 or it may be an external device in communication with the signal source unit 102. As shown in FIG. 2, the signal processing unit 104 may include a multi-signal interface for communicating with the signal source unit 102. For instance, the signal processing unit 104 may include a streaming interface 202 configured to receive audio data signals 110 from the signal source unit 102. The incoming audio data signals 110 may be pulse-code modulated signals. Pulse-code modulation (PCM) is a technique used to digitally represent sampled analog signals and is a format commonly employed in digital audio applications.

The streaming interface 202 may be configured to receive compressed or streams of audio data using an infotainment networking technology standard such as Media Oriented Systems Transport (MOST), Audio Video Bridging (AVB), or the like. If the streaming interface 202 is of an analog type, it may include an analog-to-digital converter (ADC) (not shown). In this manner, the signal source unit may convert 102 may convert digital audio to analog using a digital-to-analog converter (DAC) and send the converted audio to the signal processing unit 104. The streaming interface 202 may convert the audio back to digital format using the ADC.

As part of its multi-signal interface, the signal processing unit 104 may also include a command interface 204 configured to receive audio command signals 114 corresponding to the audio data signals 110 from the signal source unit 102. The command interface 204 may be configured to receive the audio command signals 114 using any number of communication bus protocols, such as Inter-Integrated Circuit (I2C), Controller Area Network (CAN), or the like. As previously described, the audio command signals 114 may include control commands instructing the signal processing unit 104 to apply one or more audio post-processing functions to the corresponding audio data signals 110. Alternatively, the audio command signals 114 may include an audio tuning profile command instructing the signal processing unit 104 to apply a specific audio tuning profile having preset audio settings stored in memory. As another alternative, the audio command signal 114 may include an audio signal source or content identifier that may be used by the signal processing unit 104 to select a suitable audio tuning profile to apply to the audio data signals 110.

According to one or more embodiments, the streaming interface 202 and the command interface 204 may be combined into a single-signal interface. As such, the audio data signals 110 may include command headers instructing the signal processing unit 104 which audio settings to apply to the audio data signals. Such a single-signal interface may be employed, for example, using MOST or AVB technology.

Figure 3:
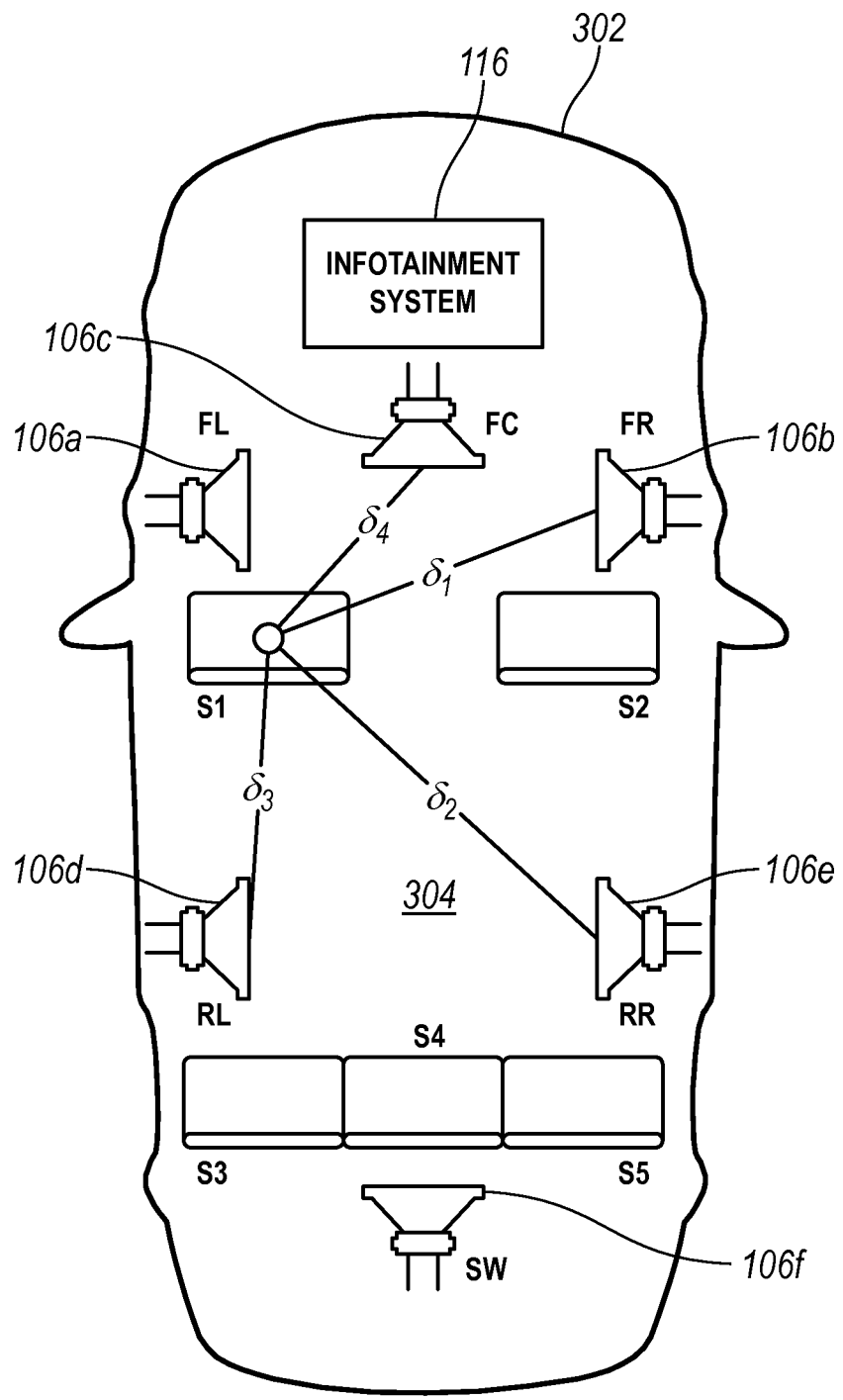
FIG. 3 depicts an exemplary audio tuning profile for a vehicle, in accordance with one or more embodiments of the present disclosure.

The signal processing unit 104 may include a memory unit 206 for storing a plurality of audio tuning profiles 208. Each audio tuning profile 208 may include audio settings 210 for generating a sound field acoustically optimized at least at one listening position in a vehicle environment. For instance, one audio tuning profile 208 may include audio settings 210 for generating a sound field acoustically optimized at the driver seat. FIG. 3 is a simplified, exemplary diagram of a vehicle 302 symbolically depicting the aforementioned scenario in which the audio settings 210 are tuned for a user located in the driver seat, S1, of a vehicle passenger compartment 304. Accordingly, in the present disclosure, an audio tuning profile with these audio settings may be referred to as Profile S1. Profile S1 may be activated for audio corresponding to navigation prompts, vehicle system alert signals or prompts (e.g., park distance controls, back-up alerts, seat belt alarms, door ajar alarms, etc.), or the like. Profile S1 is depicted in FIG. 3 using speaker delays $\delta_1$, $\delta_2$, $\delta_3$, and $\delta_4$ applied to the front right loudspeaker, rear right loudspeaker, rear left loudspeaker and center loudspeaker channels, respectively. However, the representation of Profile S1 in FIG. 3 using $\delta_1$, $\delta_2$, $\delta_3$, and $\delta_4$ is symbolic of all audio settings 210 associated with Profile S1.

Figure 4:
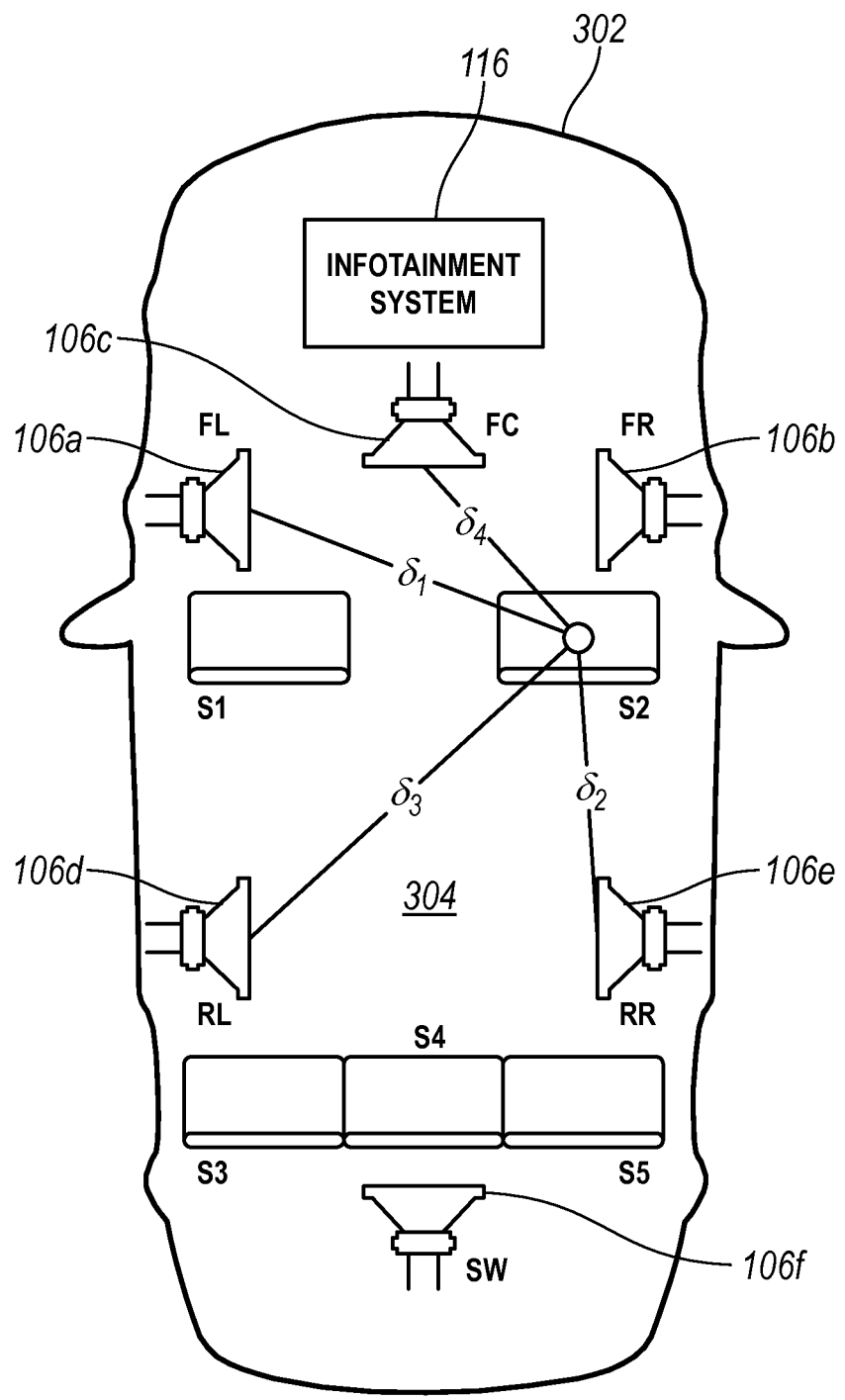
FIG. 4 depicts another exemplary audio tuning profile for a vehicle, in accordance with one or more embodiments of the present disclosure.

The vehicle 302 may also include additional listening positions associated the other seating locations, S2-S5. FIG. 4 shows another simplified, exemplary diagram symbolically depicting audio settings 210 for generating a sound field acoustically optimized at a front passenger seat, S2. An audio tuning profile with these audio settings may be referred to as Profile S2. Profile S2 may include audio settings 210 suitable for playback of audio from multimedia sources, as well as for electronic mail (email) or Subscriber Messenger Service (SMS) message readouts from connected mobile devices, or the like. The memory unit 206 may store additional audio tuning profiles 208 for generating sound fields acoustically optimized at each of the remaining seat locations, S3, S4 and S5, referred to as Profile S3, Profile S4 and Profile S5, respectively. While the vehicle 302 shown in FIGS. 3 and 4 is depicted having a passenger compartment 304 with two rows of seating, such as in a sedan or coupe, one or more embodiments of the present disclosure are equally applicable to vehicles with any number of seating configurations.

The memory unit 206 may also store audio tuning profiles 208 for generating sound fields acoustically optimized for multiple listening positions. For instance, one or more audio tuning profiles 208 may be programmed with audio settings 210 optimized for multiple passengers to experience audio entertainment sources. One such audio tuning profile 208 may include audio settings 210 for generating a sound field acoustically optimized for all listening positions in the vehicle 302. Another such audio tuning profile 208 may include audio settings 210 for generating a sound field acoustically optimized for all listening positions in a front passenger compartment 304a of the vehicle 302. Yet another such audio tuning profile 208 may include audio settings 210 for generating a sound field acoustically optimized for all listening positions in a rear passenger compartment 304b of the vehicle 302.

In the case of a factory infotainment system 116 installed by a vehicle manufacturer, the audio tuning profiles 208 may be preprogrammed by the vehicle manufacturer, or a supplier to the vehicle manufacturer, with audio settings 210 optimized for the particular vehicle in which the infotainment system is being installed. For aftermarket infotainment systems 116, a set of one or more audio tuning profiles 208 for each of a number of available vehicles may be stored in the memory unit 206. Once installed, a user may select the vehicle make and model from a settings menu via the signal source unit's HMI 120 so that the signal source unit 102 or the signal processing unit 104 knows which set of audio tuning profiles 208 to apply. Alternatively, a user may select the vehicle in which the infotainment system 116 is installed, and, if available, a set of audio tuning profiles 208 configured for the selected vehicle may be downloaded to the signal source unit 102 or the signal processing unit 104. The appropriate set of audio tuning profiles 208 may also be downloaded remotely and installed in the signal source unit 102 or signal processing unit 104 using an external storage device, such as a memory stick via a USB port.

As yet another alternative, the infotainment system 116 may be configured to perform real-time, in-vehicle measurement of listening positions to capture optimal audio settings 210. During the initial setup, the signal processing unit 104 may collect audio data on a number of different listening positions and may generate an optimized audio tuning profile 208 for each location. The audio data may be collected, for example, using binaural microphones worn by a user or a mannequin. During system configuration, the signal processing unit 104 may also be configured to measure multiple listening positions and balance the audio output between two or more seat locations. Once the initial setup is complete, the audio tuning profiles 208 may be stored in the memory unit 206 and the corresponding audio settings 210 may be applied to subsequent audio delivered to the signal processing unit 104.

Referring back to FIG. 2, the memory unit 206 may store a number of audio settings 210 associated with each tuning profile 208. The audio settings 210 may include various parameters to be applied to the audio data signals 110 by an audio post-processing module 212. Such parameters may include loudspeaker delay units, filter coefficients, volume/mute curves, source/sink connections, frequency level adjustments, or the like. Thus, the audio post-processing module 212 may perform one or more of the exemplary audio post-processing functions previously described. Further, the audio post-processing module 212 may use a digital signal processor (DSP) for applying DSP-based audio post-processing functions. The digitally-processed audio data signals 110 may then be delivered to one or more of the audio channels 108 according to the active audio tuning profile 208. As shown, each audio channel 108 may include a digital-to-analog converter (DAC) 214, which converts the digital audio information into an analog signal that can be played by the loudspeaker 106 associated with the respective audio channel 108.

The infotainments system 116 may be configured to receive input indicative of a user selection of one of the audio tuning profiles 208 via the HMI 120 provided with the signal source unit 102. According to one more embodiments of the present disclosure, the infotainment system 116 may be configured to automatically select an audio tuning profile 208 to apply to the audio data signals 110. The infotainment system 116 may select an audio tuning profile 208 based on a number of factors including, for example, seat occupancy detection, paired or otherwise connected mobile devices 122, or the like. The infotainment system 116 may detect occupancy of a passenger seat using occupancy detection techniques know to one of ordinary skill in the art. Such exemplary occupancy detection techniques may employ capacitive sensors, seat pressure sensors, optical or infrared cameras, or the like.

As previously described, the audio data signals 110 transmitted from the signal source unit 102 may be generated based on content received from at least one of a plurality of content sources. A content source may be a compact disc, a radio station, a traffic or weather information system, a connected mobile device 122, a navigation system, a connected vehicle control module (e.g., via a controller area network (CAN) bus), or the like. Thus, the content received from a content source may not necessarily include the same audio data contained in the audio data signals received by the signal processing unit 104. Rather, in some instances, the content received by the signal source unit 102 may include other information and the signal source unit 102 may generate an audio data signal 110 to convey the information, or related information, to a user audibly using prompts, alerts, messages, or the like. For instance, the signal source unit 102 may output an audible navigation prompt based on map data and coordinate data received from a GPS antenna. Similarly, the signal source unit 102 may convert text from an email to speech so that, when prompted, the email message may be communicated to a user as an audible message.

According to one or more embodiments of the present disclosure, the infotainment system 116 may also select an audio tuning profile 208 to apply to an audio data signal 110 based on the content of the audio data signal, the content source of the audio data signal, or both. In this manner, the post-processing applied by the signal processing unit 104 to incoming audio data signals 110 may be context-based. For instance, a user sitting next to the driver in seat S2 may pair, synchronize or otherwise connect a mobile device 122 to the signal source unit 102. This user may select Profile S2 on the signal source unit 102. Alternatively, the infotainment system 116 may automatically detect the presence of the user in seat S2 from a camera, seat sensor, audio or any other sensor information for occupancy detection. The infotainment system 116 may then load the audio settings 210 associated with Profile S2 suitable for generating a sound field acoustically optimized at seat location S2.

When the user starts streaming music from the connected mobile device 122, the user located at seat S2 may experience the audio optimally. If the user elects to have an SMS message or email read aloud from the mobile device 122, the infotainment system 116 may, for example, play the converted text-to-speech on a loudspeaker 106 nearest the user's seat location at an optimal volume while muting or attenuating all the other loudspeakers. Thus, according to one or more embodiments, each seat location may be associated with multiple audio tuning profiles 208 selectable based on the content of the audio. For example, as explained above, at least one audio tuning profile 208 associated with seat S2 may be selected for audio data signals 110 containing music, while another audio tuning profile 208 associated with seat S2 may be selected to output text messages from the user's mobile device 122 as speech.

Continuing the above example, when a vehicle system alert signal (e.g., a navigation prompt, traffic alert, safety alert, etc.) is received by the signal source unit 102, the infotainment system 116 may load Profile S1 corresponding to the driver's seat location, S1, so that the audible prompts can be optimally heard by the driver. Once the alert prompt is completed, Profile S2 may be re-loaded and the user located at seat S2 may continue to enjoy the audio experience of a sound field acoustically optimized for seat S2.

As another example, an audio tuning profile 208 having audio settings 210 for generating a sound field acoustically optimized for multiple seat locations may be selected, either automatically or by a user, so that audio from an audio entertainment source may be optimally experienced by multiple passengers. The audio entertainment source may be a radio station, a CD, a connected mobile device, or the like. If a user of a connected mobile device 122 authorizes an email or SMS message to be read aloud as speech, the infotainment system 116 may automatically select an audio tuning profile 208 acoustically optimized for the user's seat location while the message is played through one or more loudspeakers 106. Once the message is finished playing, the initial audio tuning profile may be re-loaded and applied to the audio from the audio entertainment source. If an alert prompt is received during playback of either the entertainment audio signal or the email/SMS message, the alert audio may take priority. Accordingly, the infotainment system 116 may select Profile S1 optimized for the driver in order to play the audible vehicle system alert (e.g., traffic alert, navigation prompt, etc.).

Figure 5:
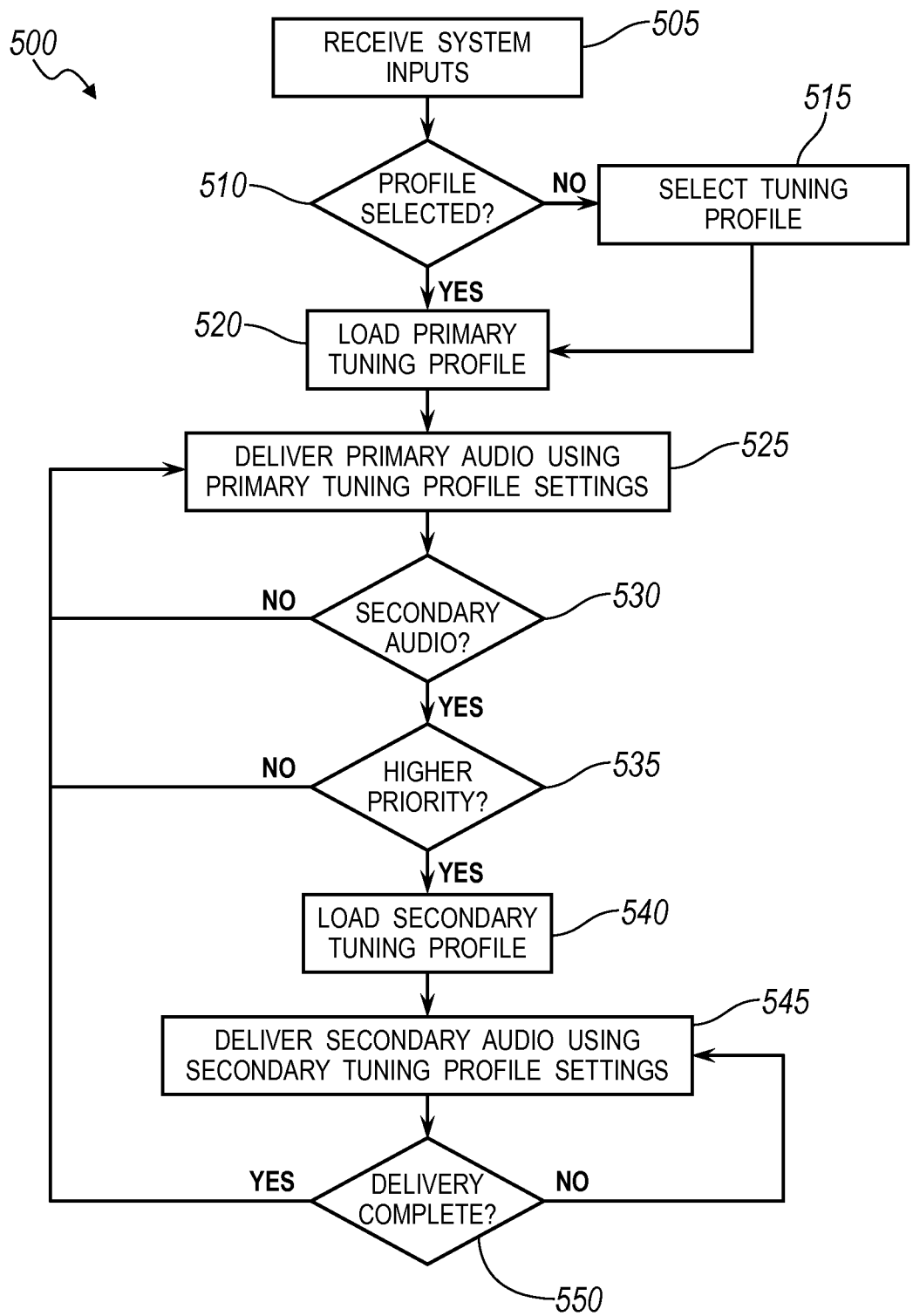
FIG. 5 is a flow diagram depicting a method for selecting a sound field acoustically optimized at least at one listening position in a vehicle environment, in accordance with one or more embodiments of the present disclosure.

FIG. 5 is a flow diagram depicting an exemplary method 500 for selecting a sound field acoustically optimized at least at one listening position in a vehicle environment based on the content of an audio data signal. As shown at step 505, the infotainment system 116 may receive a number of audio system inputs. The audio system inputs may be indicative of audio content selection, connected systems and devices, user playback settings, or the like. The signal source unit 102 may transmit a primary audio signal to the signal processing unit 104 based on the audio content selection. For instance, the primary audio signal may correspond to entertainment audio such as that read from a CD, received from a radio broadcast, streamed from the Internet or a connected mobile device, or the like. The audio system inputs may further include input indicative of an audio tuning profile 208 to be applied to the primary audio signal.

At step 510, the infotainment system 116 may determine whether an audio tuning profile 208 has been selected for the primary audio signal. If no audio tuning profile 208 has been selected by the infotainment system 116 based on the audio system inputs, the method may proceed to step 515. At step 515, the infotainment system 116 may select an audio tuning profile 208 to apply to the primary audio signal in the absence of a user selection. The audio tuning profile 208 may be automatically selected by the infotainment system 116 based on audio system inputs. For instance, the infotainment system 116 may detect the presence of an occupant in a particular listening position or an occupant's connect mobile device 122, or both, and may select a particular audio tuning profile 208 accordingly. Alternatively, the infotainment system 116 may select a default audio tuning profile 208 in the absence of a user-selected profile. The audio tuning profile 208, selected automatically or based on user input, may be referred to as the primary tuning profile. The primary tuning profile may include primary audio settings for generating a sound field acoustically optimized at least at one listening position for playback of the primary audio signal.

At step 520, the primary tuning profile including the primary audio settings to be applied to the primary audio signal may be loaded. Loading the primary tuning profile may include receiving a primary audio command signal containing the primary audio settings to be applied to the primary audio signal by the signal processing unit 104. Alternatively, loading the primary tuning profile may include receiving a primary audio command signal identifying which audio tuning profile 208 to apply to the corresponding primary audio signal and retrieving the primary audio settings to be applied from the memory unit 206. At step 525, the infotainment system 116 may transmit the primary audio signal to a group of loudspeakers 106 according to the primary tuning profile.

Turning to step 530, the infotainment system 116 may determine whether input indicative of a secondary audio signal is present. If no secondary audio signal is detected, the method may return to step 525 and the primary audio signal may continue to be delivered to the group of loudspeakers 106 according to the primary tuning profile. If, however, the presence of a secondary audio signal is detected, the method may proceed to step 535. At step 535, the infotainment system 116 may determine whether the secondary audio signal has a higher priority than the primary audio signal. For instance, vehicle system alerts and prompts may have a higher priority than text-to-speech content from a connected mobile device 122. In turn, the text-to-speech content received from the connected mobile device 122 may take priority over entertainment audio signal content such as music playback. Therefore, if the primary audio signal is a spoken email or SMS message and the secondary audio signal has lower priority, the primary audio signal may continue without interruption. If, for example, the secondary audio signal is a navigation prompt, however, the secondary audio signal may take priority. If the primary audio signal has a higher priority than the secondary audio signal, the method may return to step 525 and the primary audio signal may continue to be delivered to the group of loudspeakers 106 according to the primary tuning profile. On the other hand, if the secondary audio signal has a higher priority than the primary audio signal, the method may proceed to step 540.

Similar to step 520, the secondary tuning profile including secondary audio settings to be applied to the secondary audio signal may be loaded at step 540. According to one or more embodiments of the present disclosure, the secondary tuning profile may be selected based on the content of the secondary audio signal, the source of the secondary audio signal, or both. For instance, if the secondary audio signal is a vehicle system alert, traffic alert, navigation prompt or the like, the infotainment system 116 may select and load Profile S1 as the secondary tuning profile so that the sound field can be acoustically optimized for the seat position, S1, belonging to the driver. As another example, if the secondary audio signal is a text-to-speech signal corresponding to an SMS message or an email message from a user's connected mobile device 122, the infotainment system 116 may select and load an audio tuning profile associated with the seat location of the user.

At step 545, the infotainment system 116 may transmit the secondary audio signal to a group of loudspeakers 106 according to the secondary tuning profile. According to one or more embodiments, the primary audio signal may be completely interrupted in lieu of the secondary audio signal when the secondary audio signal has priority over the primary audio signal. Alternatively, the primary audio signal may be attenuated at one or more of the loudspeakers 106 in favor of the secondary audio signal.

At step 550, the infotainment system 116 may determine whether delivery of the secondary audio signal has been completed. If delivery of the secondary audio signal is not complete, the method may return to step 545 and so that delivery of the secondary audio signal may continue. If, however, delivery of the secondary audio signal is complete, the method may return to step 525 and the primary audio signal may continue to be delivered to the group of loudspeakers 106 according to the primary tuning profile.

While exemplary embodiments are described above, it is not intended that these embodiments describe all possible forms of the disclosed subject matter. Rather, the words used in the specification are words of description rather than limitation, and it is understood that various changes may be made without departing from the spirit and scope of the subject matter presented herein. Additionally, the features of various implementing embodiments may be combined to form further embodiments of the present disclosure.

What is claimed is:

1. A method for selecting a sound field acoustically optimized at least at one listening position in a vehicle environment, where the sound field is generated by a group of loudspeakers including a first loudspeaker and at least a second loudspeaker according to audio settings associated with a tuning profile, the method comprising:
    selecting a primary tuning profile based on audio system inputs, the primary tuning profile including a first set of audio settings;
    transmitting a primary audio signal to the group of loudspeakers according to the primary tuning profile;
    receiving an input indicative of a secondary audio signal; and
    transmitting the secondary audio signal to the group of loudspeakers according to a secondary tuning profile when the secondary audio signal has priority over the primary audio signal, the secondary tuning profile being selected based at least on content of the secondary audio signal, the secondary tuning profile including a second set of audio settings different from the first set of audio settings.

2. The method of claim 1, further comprising: interrupting transmission of the primary audio signal to the group of loudspeakers during transmission of the secondary audio signal.

3. The method of claim 1, further comprising: attenuating the primary audio signal while the secondary audio signal is transmitted to the group of loudspeakers.

4. The method of claim 1, wherein the primary audio signal is an entertainment audio signal.

5. The method of claim 1, wherein selecting a primary tuning profile based on audio system inputs includes receiving user input indicative of a selection of the primary tuning profile.

6. The method of claim 1, wherein the secondary tuning profile is further selected based on a content source of the secondary audio signal.

7. The method of claim 1, wherein the secondary audio signal is a navigation prompt received from a navigation system.

8. The method of claim 7, wherein the secondary audio signal is a vehicle system alert signal received from a vehicle system controller.

9. The method of claim 7, wherein the secondary audio signal is a traffic alert received from a traffic information system.

10. The method of claim 7, wherein the secondary audio signal is a text-to-speech signal corresponding to a text message or an electronic mail message received from a connected mobile device.

11. A system for selecting an audio tuning profile for providing a sound field acoustically optimized at least at one listening position in a vehicle environment, where the sound field is generated by a group of loudspeakers including a first loudspeaker and at least a second loudspeaker according to the audio tuning profile, the system comprising:
    a signal source unit configured to transmit audio signals from a plurality of audio sources, the audio signals including a primary audio signal and at least a secondary audio signal;
    a signal processing unit configured to:
        receive the primary audio signal from the signal source unit and transmit the primary audio signal to the group of loudspeakers according to a primary tuning profile; and
        receive the secondary audio signal from the signal source unit when the secondary audio signal has priority over the primary audio signal, select a secondary tuning profile based on content of the secondary audio signal, and transmit the secondary audio signal to the group of loudspeakers according to the secondary tuning profile;
    wherein the signal processing unit includes a memory unit having at least a first set of audio settings associated with the primary tuning profile and a second set of audio settings associated with the secondary tuning profile, the second set of audio settings being different from the first set of audio settings.

12. The system of claim 11, wherein the signal processing unit is integrated with an amplifier.

13. The system of claim 11, wherein the signal processing unit further includes an audio post-processing module that applies the first set of audio settings to the primary audio signal and the second set of audio settings to the secondary audio signal.

14. The system of claim 11, wherein the primary audio signal is temporarily interrupted during transmission of the secondary audio signal.

15. The system of claim 11, wherein the primary audio signal is attenuated during transmission of the secondary audio signal.

16. The system of claim 11, wherein the primary audio signal is an entertainment audio signal.

17. The system of claim 16, wherein the secondary audio signal is a vehicle alert or prompt.

18. The system of claim 16, wherein the secondary audio signal is a text-to-speech signal corresponding to a text message or an electronic mail message received from a connected mobile device.

19. An audio signal processing and amplification device comprising:
- a streaming interface configured to receive audio data signals from a signal source unit, the audio data signals originating from a plurality of audio sources, the audio data signals including a primary audio signal and at least a secondary audio signal, wherein the streaming interface is further configured to receive the secondary audio signal from the signal source unit when the secondary audio signal has priority over the primary audio signal;
- a command interface configured to receive audio command signals corresponding to the audio data signals from the signal source unit, the audio command signals including an audio tuning profile command;
- a memory unit configured to store a plurality of audio tuning profiles, each audio tuning profile including audio settings for generating a sound field acoustically optimized at least at one listening position in a vehicle environment, the memory unit having at least a first set of audio settings associated with a primary tuning profile and a second set of audio settings associated with a secondary tuning profile, the second set of audio settings being different from the first set of audio settings; and
- an audio post-processing module configured to: receive the audio data signals and corresponding audio command signals, retrieve an audio tuning profile from the plurality of audio tuning profiles based on the audio tuning profile command, process the audio data signals according to the audio settings associated with the audio tuning profile, and transmit the processed audio data signals to a group of loudspeakers including a first loudspeaker and at least a second loudspeaker to generate the acoustically optimized sound field associated with the audio tuning profile based on content of the audio data signals.

* * * * *